(12) United States Patent
Huang et al.

(10) Patent No.: US 8,955,354 B2
(45) Date of Patent: Feb. 17, 2015

(54) FRACTIONATION OF HYDROGEN SULFIDE RICH SOUR GAS AND METHODS OF USE

(75) Inventors: Shawn S. Huang, Spring, TX (US); Douglas Elliot, Houston, TX (US); Jame Yao, Sugar Land, TX (US); Wei Yan, Houston, TX (US); Naushad A. Kassamali, Austin, TX (US); Mark S. Elkins, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 1052 days.

(21) Appl. No.: 12/958,909

(22) Filed: Dec. 2, 2010

(65) Prior Publication Data

US 2011/0138854 A1    Jun. 16, 2011

Related U.S. Application Data

(60) Provisional application No. 61/285,279, filed on Dec. 10, 2009.

(51) Int. Cl.
| | |
|---|---|
| *F25J 3/00* | (2006.01) |
| *B01D 19/00* | (2006.01) |
| *C10L 3/10* | (2006.01) |
| *B01D 53/14* | (2006.01) |
| *C10L 3/12* | (2006.01) |

(52) U.S. Cl.
CPC ............. *C10L 3/103* (2013.01); *B01D 53/1462* (2013.01); *C10L 3/101* (2013.01); *C10L 3/104* (2013.01); *C10L 3/12* (2013.01)
USPC .................................. 62/620; 62/635; 95/186

(58) Field of Classification Search
CPC ..... B01D 53/52; B01D 53/14; B01D 53/1456; B01D 53/1462; B01D 53/1468; B01D 53/1475; B01D 53/1493; C10L 3/103; C10L 3/104; C10L 3/101
USPC ......... 62/618, 620, 630, 631, 632, 635; 95/96, 95/149, 156, 186, 237, 259
See application file for complete search history.

(56) References Cited

U.S. PATENT DOCUMENTS

| | | | |
|---|---|---|---|
| 4,318,723 A | 3/1982 | Holmes et al. | |
| 4,350,511 A * | 9/1982 | Holmes et al. | ................. 62/632 |
| 4,383,842 A | 5/1983 | O'Brien | |
| 4,428,759 A | 1/1984 | Ryan et al. | |
| 4,444,576 A | 4/1984 | Ryan et al. | |

(Continued)

OTHER PUBLICATIONS

Wikipedia, "Sour Gas", pp. 1-2.

(Continued)

*Primary Examiner* — John F Pettitt
*Assistant Examiner* — Ignacio E Landeros
(74) *Attorney, Agent, or Firm* — ConocoPhillips Company

(57) ABSTRACT

Methods and systems are provided for treating hydrogen sulfide rich sour gas through a series of fractionation columns. The processes disclosed herein and the variations thereof provide optimized processes for the removal of hydrogen sulfide from sour gas through the introduction of innovative azeotrope breakers, novel configurations of process equipment, and optimized operating conditions. Advantages of certain embodiments of the present invention include reduced equipment requirements, improved process efficiencies, reduced operating costs, and reduced capital costs. Other advantages include better process suitability to certain environmental conditions such as the arctic cold when compared to conventional amine treatment processes.

16 Claims, 4 Drawing Sheets

(56) References Cited

U.S. PATENT DOCUMENTS

| | | | |
|---|---|---|---|
| 4,459,142 A | | 7/1984 | Goddin, Jr. |
| 4,462,814 A | * | 7/1984 | Holmes et al. ................ 62/625 |
| 4,529,424 A | | 7/1985 | Gazzi et al. |
| 4,533,372 A | | 8/1985 | Valencia et al. |
| 4,717,408 A | | 1/1988 | Hopewell |
| 4,936,887 A | | 6/1990 | Waldo et al. |
| 4,976,849 A | | 12/1990 | Soldati |
| 5,062,270 A | | 11/1991 | Haut et al. |
| 5,520,249 A | | 5/1996 | Minkkinen et al. |
| 6,053,007 A | | 4/2000 | Victory et al. |
| 6,711,914 B2 | | 3/2004 | Lecomte |
| 6,735,979 B2 | | 5/2004 | Lecomte et al. |
| 6,998,098 B2 | | 2/2006 | Allison |
| 2003/0047492 A1 | | 3/2003 | Hopewell |
| 2004/0226441 A1 | * | 11/2004 | Palmer ........................ 95/235 |
| 2007/0221541 A1 | | 9/2007 | McClanahan et al. |
| 2008/0184887 A1 | | 8/2008 | Mak |
| 2009/0090049 A1 | * | 4/2009 | Chinn et al. ................ 44/457 |

OTHER PUBLICATIONS

Wikipedia, Hydrogen Sulfide, pp. 1-8.

PCT Notification of Transmittal of the International Search Report and the Written Opinion of the International Searching Authority, or the Declaration, Apr. 6, 2011, 20 pages.

* cited by examiner

FRACTIONATION OF HYDROGEN SULFIDE RICH SOUR GAS AND METHODS OF USE

CROSS-REFERENCE TO RELATED APPLICATIONS

This application is a non-provisional application which claims the benefit of and priority to U.S. Provisional Application Ser. No. 61/285,279 filed Dec. 10, 2009, entitled "Fractionation of Hydrogen Sulfide Rich Sour Gas and Methods of Use," which is hereby incorporated by reference in its entirety.

FIELD OF THE INVENTION

The present invention relates generally to the treatment of sour gas and more particularly, but not by way of limitation, embodiments of the present invention include methods and systems for treating hydrogen sulfide rich sour gas through fractionation.

BACKGROUND

Sour gas is natural gas or any other hydrocarbon gas containing significant amounts of hydrogen sulfide ($H_2S$). These gases, because of the rotten egg smell provided by its sulfur content, is commonly called "sour gas." Typically, the sulfur that exists in a sour gas stream can be extracted and marketed on its own. In fact, according to the U.S. Geological Survey, U.S. sulfur production from gas processing plants accounts for about 15 percent of the total U.S. production of sulfur. Natural gas is usually considered sour if there are more than 5.7 milligrams of $H_2S$ per cubic meter of natural gas, which is equivalent to approximately 4 ppm by volume. On the other hand, natural gas that does not contain significant amounts of hydrogen sulfide is called "sweet gas." In contrast, acid gas is any gas that contains significant amounts of acidic gases such as carbon dioxide ($CO_2$) or hydrogen sulfide.

Before a raw natural gas containing hydrogen sulfide and/or carbon dioxide can be used, the raw gas must be treated to remove those impurities to acceptable levels. This treatment to remove hydrogen sulfide is referred to as a sweetening process. The removed hydrogen sulfide is most often subsequently converted to by-product elemental sulfur in a Claus process or it can be treated in a WSA Process unit where the by-product is sulfuric acid.

Treatment of sour gas to remove hydrogen sulfide is important because the presence of sour gas is usually undesirable in fuel streams because sulfur compounds can be extremely harmful, even lethal, to breathe. Moreover, sour gas can be extremely corrosive. Therefore, gas processing is an instrumental piece of the natural gas value chain. It is instrumental in ensuring that the natural gas intended for use is as clean and pure as possible, making it the clean burning and environmentally sound energy choice.

Challenges encountered in treating sour gas include a high variability in the concentration of sour gas components, such as hydrogen sulfide, carbon dioxide, various hydrocarbons, and other components. Sour gas streams especially rich in hydrogen sulfide concentrations on the order of at least about 15%, at least about 20%, and higher are especially challenging to treat in terms of the process equipment required to achieve the desired hydrogen sulfide removal. Unless otherwise noted, all percentages in this specification are based on a mole percent or a volume percent basis.

A variety of conventional treatment methods exist for removal of hydrogen sulfide from sour gas. By far, the most common conventional method for treating sour gas to remove the hydrogen sulfide is by an amine gas treating process. Other conventional methods of sour gas treatment include limited cryogenic fractionation processes.

The amine process, alternatively known as the Girdler process, is used in about 95 percent of U.S. gas sweetening operations. In this process, the sour gas is run through a tower, which contains the amine solution. This solution has an affinity for hydrogen sulfide, and absorbs it much like glycol absorbing water. Although a number of amine solvents may be used, two principle amine solutions used include monoethanolamine (MEA) and diethanolamine (DEA). Either of these compounds, in aqueous solution, will absorb sulfur compounds from natural gas as it passes through. The effluent gas is virtually free of sulfur compounds, and thus loses its sour gas status. The amine solution used can be regenerated (that is, the absorbed sulfur is removed), allowing it to be reused to treat more sour gas.

Unfortunately, conventional amine plants for the recovery of hydrogen sulfide suffer from a number of disadvantages. First, hydrogen sulfide amine separation plants are typically extremely energy intensive processes requiring significant amounts of energy to effect the required separations. Generally, higher $H_2S$ concentrations in sour gas require higher amounts of energy. This high energy requirement is undesirable both in terms of the resources required and cost considerations. Consequently, conventional amine treatment processes become much less desirable as the $H_2S$ content of sour gas increases.

Additionally, the carbon dioxide stream that is produced by an amine plant is typically produced at pressures close to ambient pressure. Consequently, sequestration of the carbon dioxide becomes problematic, because substantially elevated pressures are required to sequester carbon dioxide. Accordingly, sequestration of carbon dioxide from an amine plant requires additional costly equipment to compress the carbon dioxide to allow it to be captured, held, or subsequently used.

In addition to the problems of high energy usage and the challenges of carbon dioxide sequestration, amine treatment processes are also problematic with regards to solvent treatment. Because amine plants reuse their absorption solvents, the solvents must be regenerated by removing the absorbed sulfur compounds. This solvent regeneration in turn requires significant additional equipment, resulting in increased costs.

Moreover, amine plants are ill-suited for some environments such as the arctic cold. Because amine plants require certain elevated temperatures, additional heaters would be required to maintain the target operating temperatures of the process equipment if the plant were operated in such a cold region.

Furthermore, while amine plants remove sulfur compounds from sour gas, they fail to separate any carbon dioxide present in the sour gas. Thus, any carbon dioxide present in sour gas simply passes through an amine plant, staying with the produced hydrogen sulfide stream. Accordingly, any sulfur plant downstream of an amine plant must be sized to handle the additional throughput required by the presence of the carbon dioxide in the sulfur plant feed stream. Although some carbon dioxide can be tolerated in sweet gas streams, the increase in equipment size to handle the presence of the additional carbon dioxide can, in some cases, be quite substantial, resulting in undesirable equipment costs.

In addition to the common amine treatment processes, conventional cryogenic methods have been attempted to remove hydrogen sulfide from sour gas. Unfortunately, conventional cryogenic methods suffer from a number of disadvantages. For example, conventional cryogenic methods often suffer from the problem of solid formation in the cryogenic process equipment, resulting in plugged equipment and separation inefficiencies.

Moreover, conventional cryogenic methods suffer from separation difficulties due to the presence of various azeotropes. An azeotrope is a mixture of two or more liquids in such a ratio that its composition cannot be changed by simple distillation. This inability to separate components by distillation occurs because, when an azeotrope is boiled, the resulting vapor has the same ratio of constituents as the original mixture.

One example of an azeotrope that complicates the treatment of sour gas is the carbon dioxide/ethane azeotrope. Although highly desirable, the separation of carbon dioxide from ethane by distillation has proven to be a difficult problem in practice. This difficulty is caused by the fact that carbon dioxide and ethane form an azeotrope of approximately two thirds carbon dioxide and one third ethane on a mole basis. For a feed mixture containing ethane and carbon dioxide, this azeotrope tends to form in the upper portion of the column, usually making further separation beyond the azeotrope composition impossible. The common practice of employing two distillation towers operating at different pressures to work around the azeotrope does not help with the carbon dioxide/ethane system, because pressure has only a minimal effect on the composition of the azeotrope. Because of this insensitivity to pressure, attempts to separate carbon dioxide from ethane by distillation have heretofore resulted in an overhead carbon dioxide stream containing approximately azeotropic amounts of ethane, which are unacceptable in many applications.

Another example of an azeotrope complicating the treatment of sour gas is the ethylene/carbon dioxide azeotrope. Additionally, it is known that the acid gas hydrogen sulfide forms azeotropes with both ethane and propane. These and other possible azeotropes between acid gases and light hydrocarbons present limitations similar to those described for the carbon dioxide/ethane system when efforts are made to perform distillative separations on such systems.

Accordingly, there is a need in the art for improved processes for the treatment of sour gas that address one or more disadvantages of the prior art.

SUMMARY

The present invention relates generally to the treatment of sour gas and more particularly, but not by way of limitation, embodiments of the present invention include methods and systems for treating hydrogen sulfide rich sour gas through fractionation.

Methods and systems are provided for treating hydrogen sulfide rich sour gas through a series of fractionation columns. The processes disclosed herein and the variations thereof provide optimized processes for the removal of hydrogen sulfide from sour gas through the introduction of innovative azeotrope breakers, novel configurations of process equipment, and optimized operating conditions. The conditions chosen combined with the optional use of certain recycle streams makes the processing $H_2S$-rich streams feasible.

One example of a process for the recovery of hydrogen sulfide from sour gas through fractionation comprises the steps of: introducing a multi-component feed stream to a first distillation column, wherein the first distillation column is a demethanizer column, wherein the multi-component feed stream comprises carbon dioxide, methane, ethane, propane, and hydrogen sulfide; introducing an alkyl hydrocarbon mixture into the first distillation column, wherein the alkyl hydrocarbon mixture comprises ethane; withdrawing a first vapor overhead stream from the first distillation column wherein the first vapor overhead stream is a methane-enriched stream; withdrawing a first liquid bottoms stream from the first distillation column; introducing the first liquid bottoms stream to a second distillation column, wherein the second distillation column is a $CO_2/H_2S$ fractionation column; withdrawing a second vapor overhead stream from the second distillation column, wherein the second vapor overhead stream is a carbon dioxide and ethane-enriched stream; withdrawing a second liquid bottoms stream from the second distillation column, wherein the second liquid bottoms stream is a hydrogen sulfide enriched stream; introducing the second liquid bottoms stream to a third distillation column, wherein the third distillation column is a De-$H_2S$ fractionation column; introducing a first azeotrope breaker into the third distillation column; withdrawing a third vapor overhead stream from the third distillation column, wherein the third vapor overhead stream is a hydrogen sulfide enriched stream; withdrawing a third liquid bottoms stream from the third distillation column, wherein the third liquid bottoms stream is an alkane enriched stream; introducing the third liquid bottoms stream to a fifth distillation column, wherein the fifth distillation column is a debutanizer fractionation column; withdrawing a fifth vapor overhead stream from the fifth distillation column, wherein the fifth vapor overhead stream is enriched in propane and lighter hydrocarbons; withdrawing a fifth liquid bottoms stream from the fifth distillation column; introducing the second vapor overhead stream to a fourth distillation column, wherein the fourth distillation column is a De-$CO_2$ fractionation column; recycling at least a portion of the fifth liquid bottoms stream to the third distillation column and the fourth distillation column; introducing a second azeotrope breaker to the fourth distillation column; and withdrawing a fourth vapor overhead stream from the fourth distillation column, wherein the fourth vapor overhead stream is a carbon dioxide-enriched stream.

One example of a process for the treatment of sour gas comprises the steps of: introducing a multi-component feed stream to a first distillation column, wherein the first distillation column is a demethanizer column, wherein the multi-component feed stream comprises carbon dioxide, methane, ethane, propane, and hydrogen sulfide; introducing an alkyl hydrocarbon mixture into the first distillation column, wherein the alkyl hydrocarbon mixture comprises ethane; withdrawing a first vapor overhead stream from the first distillation column wherein the first vapor overhead stream is a methane-enriched stream; withdrawing a first liquid bottoms stream from the first distillation column; introducing the first liquid bottoms stream to a second distillation column, wherein the second distillation column is a $CO_2/H_2S$ fractionation column; withdrawing a second vapor overhead stream from the second distillation column, wherein the second vapor overhead stream is a carbon dioxide and ethane-enriched stream; withdrawing a second liquid bottoms stream from the second distillation column, wherein the second liquid bottoms stream is a hydrogen sulfide enriched stream; introducing the second liquid bottoms stream to a third distillation column, wherein the third distillation column is a De-$H_2S$ fractionation column; introducing a first azeotrope breaker into the third distillation column; withdrawing a third vapor overhead stream from the third distillation column, wherein the third vapor overhead stream is a hydrogen sulfide enriched stream; withdrawing a third liquid bottoms stream from the third distillation column, wherein the third liquid bottoms stream is an alkane enriched stream; introducing the second vapor overhead stream to a fourth distillation column, wherein the fourth distillation column is a De-$CO_2$ fractionation column; introducing a second azeotrope breaker to the fourth distillation column; and withdrawing a fourth vapor overhead stream from the fourth distillation column, wherein the fourth vapor overhead stream is a carbon dioxide-enriched stream.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein.

Figure 1:
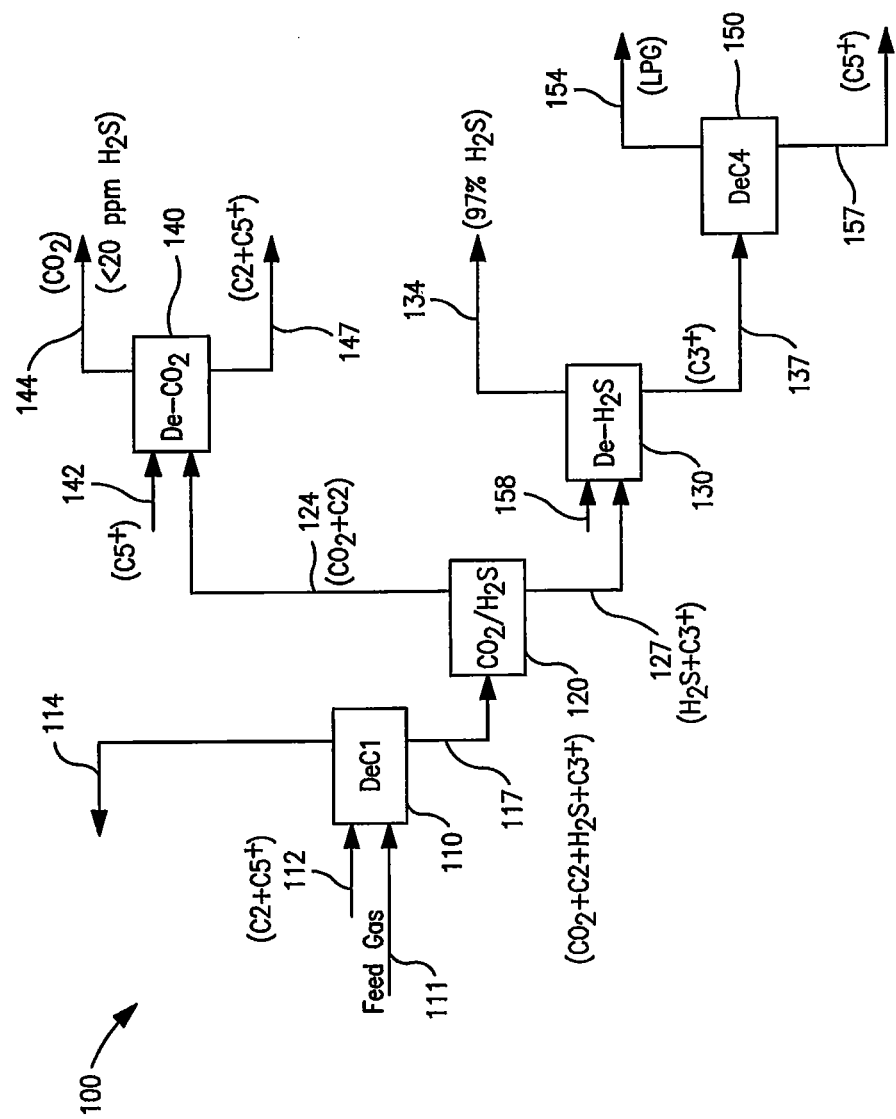
FIG. 1 illustrates a simplified process flow diagram for a method for treating sour gas in accordance with one embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates generally to the treatment of sour gas and more particularly, but not by way of limitation, embodiments of the present invention include methods and systems for treating hydrogen sulfide rich sour gas through fractionation.

Methods and systems are provided for treating hydrogen sulfide rich sour gas through a series of fractionation columns. The processes disclosed herein and the variations thereof provide optimized processes for the removal of hydrogen sulfide from sour gas through the introduction of innovative azeotrope breakers, novel configurations of process equipment, and optimized operating conditions.

Advantages of certain embodiments of the present invention include, but are not limited to, reduced equipment requirements, improved process efficiencies, reduced operating costs, and reduced capital costs. Other advantages include better process suitability to certain environmental conditions such as the arctic cold when compared to conventional amine treatment processes.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

FIG. 1 illustrates a simplified process flow diagram for a method for treating sour gas in accordance with one embodiment of the present invention. More particularly, FIG. 1 illustrates a system of five interconnected fractionation columns for treating a multi-component feed stream 111 via sour gas treatment process 100.

Multi-component feed stream 111 is a sour gas stream to be treated, which may comprise hydrogen sulfide, carbon dioxide, and various hydrocarbons such as methane, ethane, propane, other alkyl components, and other compounds typically found in sour gas sources. Sour gas treatment process 100 is particularly suited for treating multi-component feed streams rich in hydrogen sulfide, such as at least about 15% hydrogen sulfide, at least about 20% hydrogen sulfide, and higher. Unless otherwise noted, all percentages in this specification are based on a mole percent or a volume percent basis. In the embodiment depicted in FIG. 1, feed stream 111 has the following concentrations, as shown in FIG. 1: about 23% $H_2S$, about 10% $CO_2$, about 60% $C_1$, about 4% $C_2$, and about 3% $C_3$. Obviously, component feed concentrations could vary greatly depending on the source of sour gas feed 111.

As will be further discussed below, sour gas treatment process 100 recovers hydrogen sulfide from feed stream 111. In certain embodiments, sour gas treatment process 100 produces hydrogen sulfide enriched stream 134 having hydrogen sulfide concentrations of at least about 95%, at least about 97% or higher. Other output streams enriched in other components are likewise produced from sour gas treatment process 100 as will be described further below. Parenthetical notations are shown adjacent to each stream indicating the major enriched components of each stream illustrative of the present example discussed herein. The parenthetical notations and the example stream specifications are illustrative only and are intended to be non-limiting examples representative of major stream components.

Sour gas treatment process 100 begins with feed stream 111 being introduced into a first distillation column, referred to herein as demethanizer 110. Demethanizer 110 is any distillation column adapted to substantially remove methane from sour gas feed stream 111. In certain embodiments, an optional hydrocarbon stream comprising one or more alkyl hydrocarbons 112 is introduced into demethanizer 110. In certain embodiments, optional stream 112 substantially comprises a mixture of one or more of ethane, pentane, and hexane. Optional stream 112 may assist in downstream separation of $CO_2$ and $H_2S$ in a $CO_2/H_2S$ splitter 120 as will be described further below.

In certain embodiments, demethanizer 110 is a distillation column having about 18 ideal stages, an overheads temperature from about −94° F. to about 6° F., a bottoms temperature from about 35° F. to about 135° F., and a pressure from about 300 psia to about 600 psia. As used herein, all distillation column pressures refer to the overhead pressure of the distillation column unless otherwise noted.

Demethanizer 110 produces first overhead vapor stream 114 and first liquid bottoms stream 117. First overhead vapor stream 114 is substantially enriched in methane, whereas first liquid bottoms stream 117 is substantially reduced in methane concentration. First overhead vapor stream 114 may be further treated to reduce impurities so as to obtain a methane stream of desired purity. In this way, demethanizer 110 accomplishes the first step of treating the sour gas, namely substantially removing methane from multi-component feed stream 111.

First liquid bottoms stream 117 is then routed to a second distillation column, referred to herein as $CO_2/H_2S$ splitter 120. In certain embodiments, $CO_2/H_2S$ splitter 120 is a distillation column having about 30 ideal stages, an overheads temperature from about −43° F. to about 57° F., a bottoms temperature from about 70° F. to about 170° F., and a pressure from about 235 psia to about 535 psia.

$CO_2/H_2S$ splitter 120 produces second overhead vapor stream 124 and second liquid bottoms stream 127. Second overhead vapor stream 124 is substantially enriched in carbon dioxide and ethane, whereas second liquid bottoms stream 127 is substantially enriched in hydrogen sulfide and propane and heavier hydrocarbons. In this way, $CO_2/H_2S$ splitter 120 substantially removes $CO_2$ and ethane from first liquid bottoms stream 117.

Second liquid bottoms stream 127 then proceeds to the third distillation column, referred to herein as De-$H_2S$ column 130, while second overhead vapor stream 124 then proceeds to the fourth distillation column, referred to herein as De-$CO_2$ column 140.

In certain embodiments, De-$CO_2$ column 140 is a distillation column having about 36 ideal stages, an overheads temperature from about −18° F. to about 82° F., a bottoms temperature from about 86° F. to about 186° F., and a pressure from about 210 psia to about 510 psia.

De-$CO_2$ column 140 produces fourth overhead vapor stream 144 and fourth liquid bottoms stream 147. Second azeotrope breaker 142 is introduced to De-$CO_2$ column 140 to break the carbon dioxide/ethane azeotrope. In certain embodiments, second azeotrope breaker 142 comprises one or more alkyl hydrocarbons, and in still other embodiments, comprises a mixture of pentane and heavier hydrocarbons.

Fourth overhead vapor stream 144 is substantially enriched in carbon dioxide, whereas fourth liquid bottoms stream 147 is substantially enriched in the remaining hydrocarbons. In certain embodiments, the carbon dioxide produced in fourth overhead vapor stream 144 comprises an output stream having any of the following impurity concentrations: less than about 30 ppm hydrogen sulfide, less than about 20 ppm hydrogen sulfide, or less than about 10 ppm hydrogen sulfide. In this way, De-$CO_2$ column 140 substantially removes carbon dioxide and ethane from second vapor overhead stream 124.

Because De-$CO_2$ column 140 is operated at high pressure, fourth overhead vapor stream 144 is produced at a pressure of from about 300 to about 400 psia. This high pressure is highly advantageous for the subsequent sequestration of this carbon dioxide stream, that is, the capturing, holding, or subsequent use of the carbon dioxide for other applications. Many conventional processes for the recovery of carbon dioxide from sour gas produce carbon dioxide at ambient pressure, which effectively prevents sequestration of the carbon dioxide without additional equipment such as sizeable compressors.

Returning to second liquid bottoms stream 127 from $CO_2/H_2S$ splitter 120, this stream 127 then proceeds to De-$H_2S$ column 130 for separation of the remaining hydrocarbons from the hydrogen sulfide present in second liquid bottoms stream 127. First azeotrope breaker 158 may be introduced to De-$H_2S$ column 130 to assist in breaking any azeotropes present in De-$H_2S$ column 130. Examples of azeotropes present in De-$H_2S$ column 130 include the $H_2S$/ethane azeotrope and the $H_2S$/propane azeotrope. First azeotrope breaker 158 may comprise any one or more alkyl hydrocarbons that assist in enhancing the separation of $H_2S$ from ethane and/or propane. Examples of suitable azeotrope breakers include, but are not limited to, hexane, heptane, any alkyl hydrocarbon having 8 or more carbons, or any mixture thereof.

In certain embodiments, De-$H_2S$ column 130 is a distillation column having about 40 ideal stages, an overheads temperature from about 20° F. to about 120° F., a bottoms temperature from about 275° F. to about 375° F., and a pressure from about 115 psia to about 415 psia.

Thus, De-$H_2S$ column 130 produces third overhead vapor stream 134 and third liquid bottoms stream 137. Third overhead vapor stream 134 is substantially enriched in hydrogen sulfide, whereas third liquid bottoms stream 137 is substantially enriched in the remaining hydrocarbons. In certain embodiments, the hydrogen sulfide concentration of third overhead vapor stream 134 comprises an output stream having any one of the following concentrations: at least about 95% hydrogen sulfide, at least about 97% hydrogen sulfide, or at least 99% hydrogen sulfide. In this way, De-$H_2S$ column 130 substantially recovers hydrogen sulfide from second liquid bottoms stream 127.

Third overhead vapor stream 134, which is enriched in hydrogen sulfide may be subsequently converted to by-product elemental sulfur in a Claus process. Alternatively, it can be treated in a WSA Process unit where the by-product is sulfuric acid or otherwise used as desired.

Third liquid bottoms stream 137 may optionally be subjected to further processing in a fifth distillation column, referred to herein as debutanizer 150. In certain embodiments, debutanizer 150 is a distillation column having about 27 ideal stages, an overheads temperature from about 118° F. to about 218° F., a bottoms temperature from about 290° F. to about 390° F., and a pressure from about 50 psia to about 350 psia.

In effect, debutanizer 150 separates third liquid bottoms stream 137 into fifth vapor overhead stream 154 and fifth liquid bottoms stream 157. Fifth liquid bottoms stream 157 is substantially enriched with pentane and heavier hydrocarbons, whereas fifth vapor overhead stream 154 comprises butane and lighter hydrocarbons. Fifth vapor overhead stream 154 may be condensed and sent to liquid treatment for further processing or sold as liquefied petroleum gas, commonly known as LPG.

Fifth liquid bottoms stream 157 is then routed to a condensate stabilizer for removal of the lights and/or volatile components so as to render the remaining heavies stream suitable for storage.

In this way, sour gas treatment process 100 separates sour gas multi-component feed stream in a multitude of useful and valuable product streams. Although FIG. 1 depicts one simplified flow diagram, it is explicitly recognized that the invention herein may be practiced by any subset of the columns depicted in FIG. 1. For example, in some embodiments, optional fractionation columns 110, 140, and 150 may be excluded.

Figure 2:
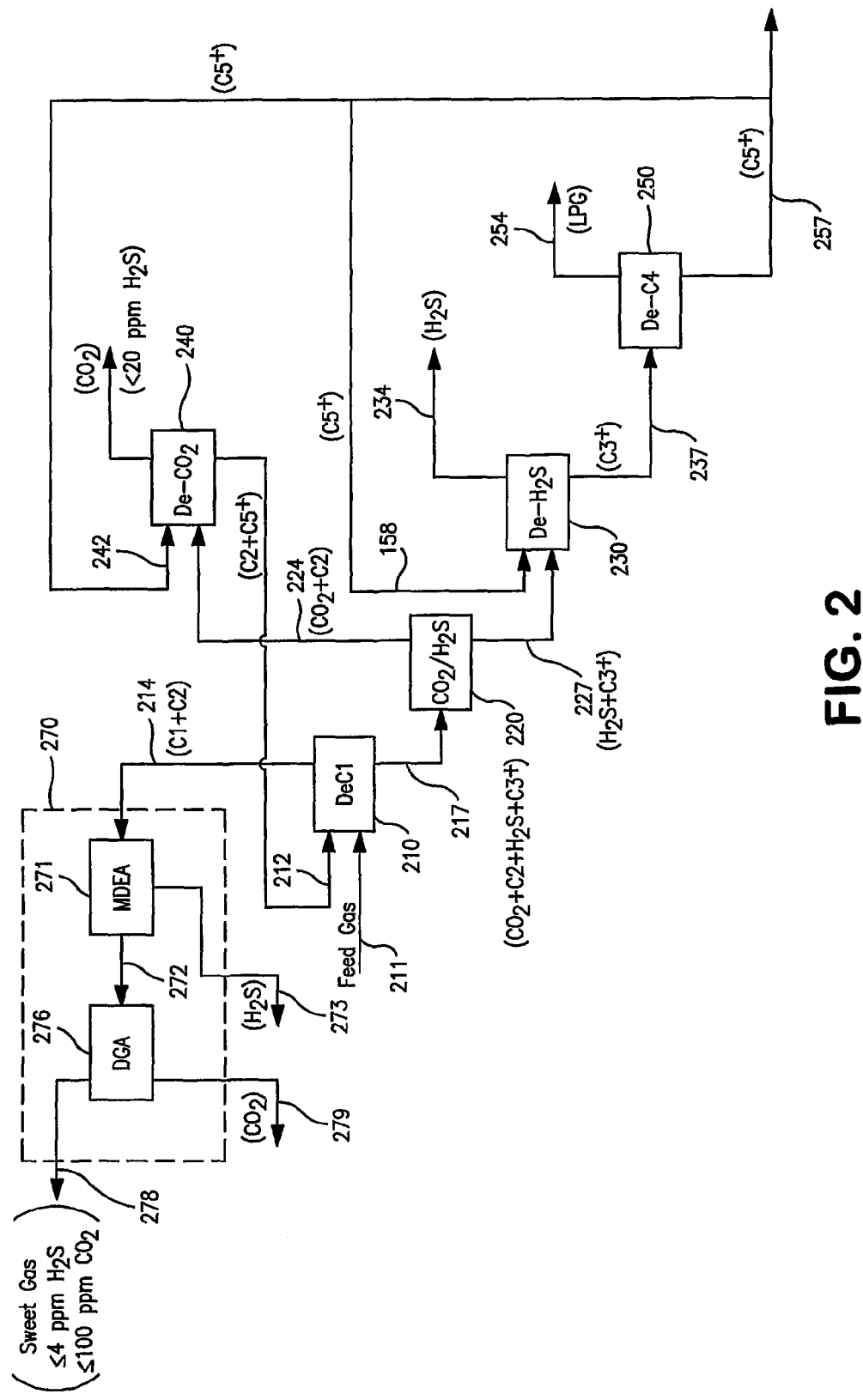
FIG. 2 illustrates another simplified process flow diagram for a method for treating sour gas in accordance with one embodiment of the present invention.

FIG. 2 illustrates another simplified process flow diagram for a method for treating sour gas in accordance with one embodiment of the present invention. Like the simplified process flow diagram depicted in FIG. 1, FIG. 2 likewise depicts a five distillation column process 200 utilizing analogous numbering to the numbering shown in FIG. 1, with the exceptions noted below. Sour gas treatment process 200 of FIG. 2, however, also includes optional polishing process 270 and additional recycle streams as discussed directly below.

The first vapor overhead stream from demethanizer 210 is substantially enriched in methane. In the event that the concentrations of first vapor overhead stream 214 may not be pure enough for its intended use, first vapor overhead stream 214 may be subjected to additional treatment. The additional treatment may comprise optional polishing process 270, which comprises an amine treating process for substantial removal of any remaining hydrogen sulfide and carbon dioxide from first vapor overhead stream 214. In certain embodiments, optional polishing process 270 comprises a two-stage absorption process comprising a methyldiethanolamine (MDEA) absorber and a diglycolamine (DGA) absorber. Other solvents may be used such as monoethanolamine (MEA), diethanolamine (DEA), diisopropanolamine (DIPA), or any combination thereof. In the embodiment depicted in FIG. 2, MDEA Absorber 271 substantially removes hydrogen sulfide via hydrogen sulfide stream 273, which may be combined with third vapor overhead stream 234 if desired. Gas stream 272 is then directed to DGA Absorber 276 for recovery of any remaining carbon dioxide, primarily methane gas as methane product stream 278 of optional polishing process 270.

In certain embodiments, methane product stream 278 comprises less than about 10 ppm hydrogen sulfide, less than about 4 ppm hydrogen sulfide, or less than about 2 ppm hydrogen sulfide. Additionally, methane product stream 278 may comprise less than about 150 ppm carbon dioxide, less than about 100 ppm carbon dioxide, or less than about 50 ppm carbon dioxide. Where methane product stream 278 comprises less than about 4 ppm hydrogen sulfide, methane product stream 278 may be referred to as "sweet gas."

In addition to optional polishing process 270, the embodiment depicted in FIG. 2 contains additional enhancements, namely a number of recycle streams that allow optimization of sour gas treatment process 200. More particularly, optional hydrocarbon stream 212 is provided by at least a portion of fourth liquid bottoms stream 212. In certain embodiments, optional stream 212 substantially comprises a mixture of one or more of ethane, pentane, and hexane. The addition of recycle stream 212 has been found to offer additional separation enhancement, particularly with respect to the downstream separation of $CO_2$ and $H_2S$ in a $CO_2/H_2S$ splitter 220. First azeotrope breaker 158 and second azeotrope breaker 242 are provided by at least a portion of fifth liquid bottoms stream 257.

To facilitate a better understanding of the present invention, the following examples of certain embodiments are given. In no way should the following examples be read to limit, or define, the scope of the invention.

Figures 1, 3:
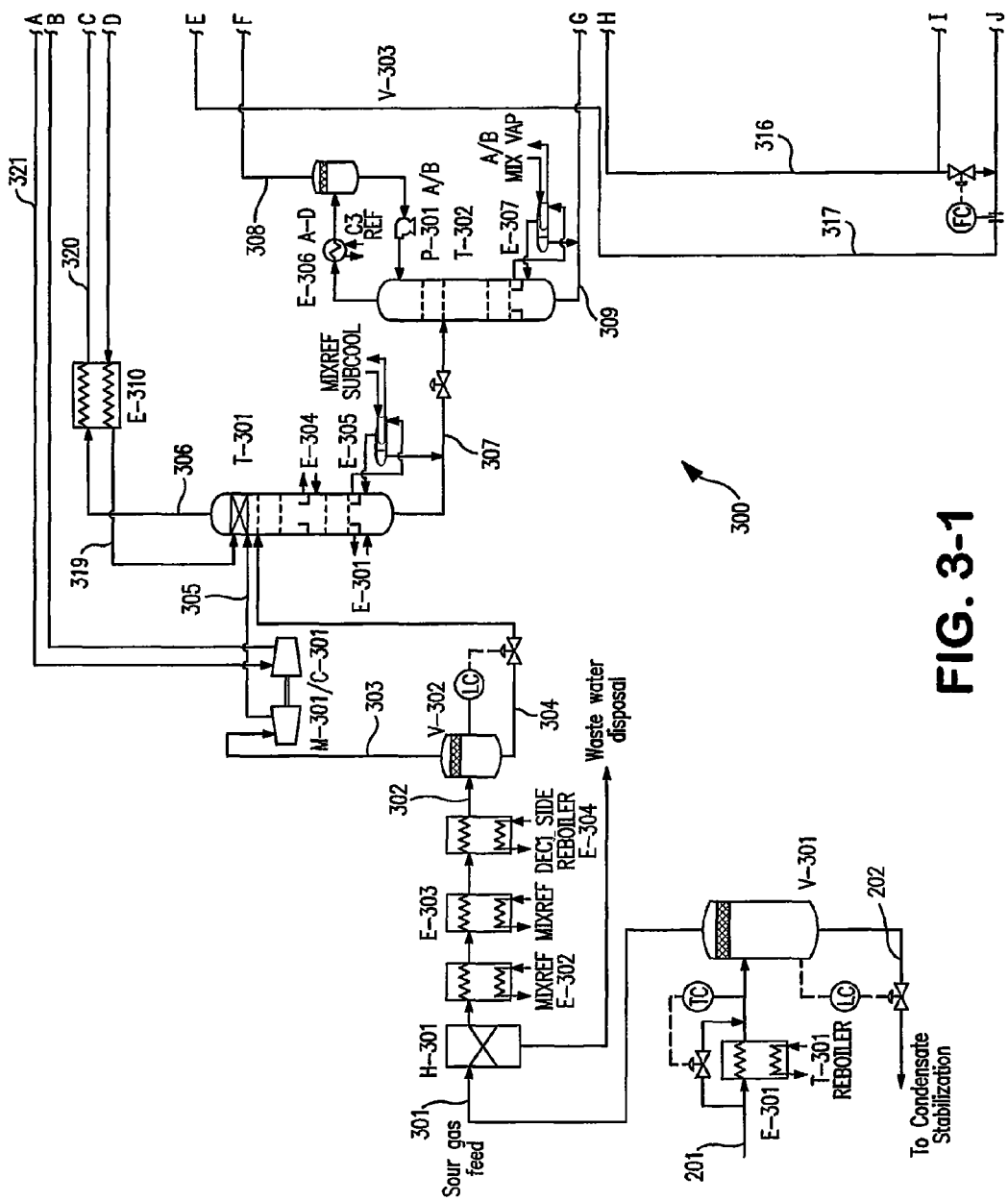
FIG. 3 illustrates an exemplary process flow diagram of a method for treating sour gas in accordance with one embodiment of the present invention.
Figures 2, 3:
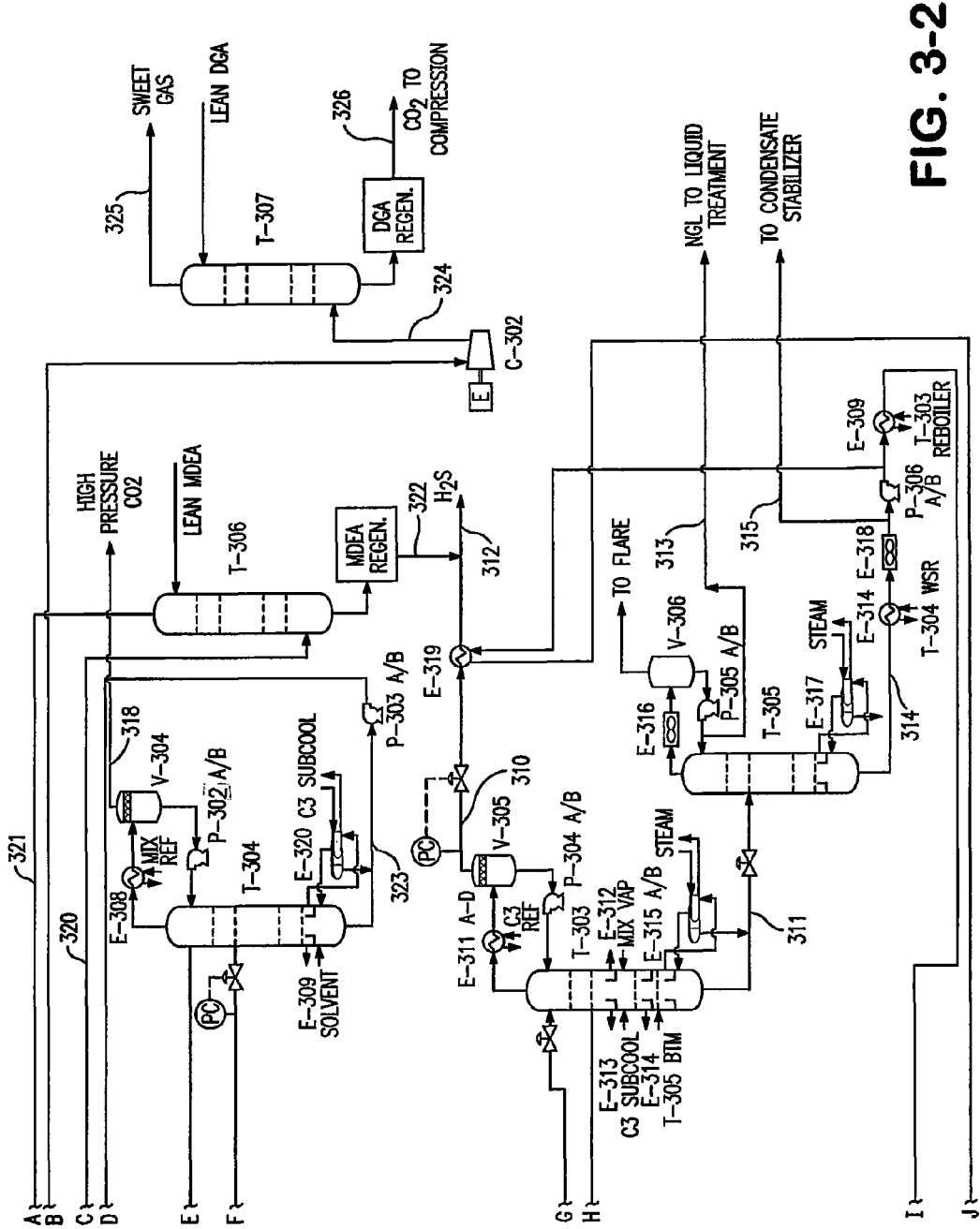

FIG. 3 illustrates an exemplary process flow diagram of a method for treating sour gas in accordance with one embodiment of the present invention. The detailed process flow diagram of FIG. 3 was modeled using HYSYS® simulation software. Table 1 shows an equipment list corresponding to the equipment depicted in FIG. 3. As one of ordinary skill in the art would understand, those reference numerals beginning with "E-" refer to heat exchangers (e.g. reboilers, condensers); reference numerals beginning with "V-" refer to flash drums; reference numerals beginning with "P-" refer to pumps, reference numerals beginning with "M-" refer to motors, and reference numerals beginning with "C-" refer to compressors.

TABLE 1

Equipment Legend for Equipment Listed in FIG. 3

| | | | |
|---|---|---|---|
| E-304 DEC1 SIDE REBOILER | M-301/C-301 EXPANDER COMPRESSOR | T-301 DEMETHANIZER | E-305 DEMETHANIZER TRIM REBOILER/ MIXREF SUBCOOL |
| T-302 CO2/H2S SPLITTER | E-307 A/B CO2/H2S SPLITTER REBOILERS | V-303 CO2/H2S SPLITTER REFLUX DRUM | E-306 A-D CO2/H2S SPLITTER CONDENSERS |
| E-316 DEBUTANIZER CONDENSER | V-306 DEBUTANIZER REFLUX DRUM | E-317 DEBUTANIZER REBOILER | E-318 CONDENSATE AIR COOLER |
| E-309 C5+ SOLVENT COOLER | T-306 MDEA COLUMN | P-302 A/B DE-$CO_2$ COLUMN REFLEX PUMPS | P-303 A/B SOLVENT PUMPS |
| E-310 SOLVENT COOLER | E-319 C5+ SOLVENT COOLER/$H_2S$ HEATER | T-304 DE-$CO_2$ COLUMN | V-304 DE-$CO_2$ COLUMN REFLUX DRUM |
| E-309 DE-$CO_2$ COLUMN REBOILER | T-303 DE-$H_2S$ COLUMN | E-111 A-D DE-$H_2S$ COLUMN CONDENSER | V-305 DE-$H_2S$ COLUMN REFLUX DRUM |
| E-315 A/B DE-$H_2S$ COLUMN REBOILERS | P-304 A/B DE-$H_2S$ COLUMN REFLUX PUMPS | P-305 A/B DEBUTANIZER REFLUX PUMPS | P-306 A/B C5+ SOLVENT PUMPS |
| C-302 SWEET GAS COMPRESSOR | T-307 DGA COLUMN | E-320 DE-$CO_2$ COLUMN REBOILER/C3 SUBCOOL | E-312 MIX REF CONDENSER |
| E-301 DEMETHANIZER REBOILER | P-301 A/B DEETHANIZER REFLUX PUMPS | E-314 C5+ SOLVENT COOLER/DE-$H_2S$ SIDE REBOILER | V-302 EXPANDER FEED SEPARATOR |
| E-313 C3 SUBCOOL/T-304 COLD SR | E-308 DE-$CO_2$ COLUMN CONDENSER | T-305 DEBUTANIZER | |

Sour gas treatment process 300 depicts a five stage distillation process, although the invention may be practiced any one or more of the five stages. Similar to the previous embodiments, Demethanizer Column T-301 works in conjunction with $CO_2/H_2S$ Splitter T-302, De-$H_2S$ Column T-303, De-$CO_2$ Column T-304, and Debutanizer T-305. Table 2 below shows a heat and material balance corresponding to the process flow diagram depicted in FIG. 3 that was generated using the modeling software with the input streams as indicated. In this way, FIG. 3 along with the heat and material balance shown in Table 2 demonstrates the efficacy of the methods disclosed herein for the treatment of sour gas. It is explicitly recognized that the values shown throughout the heat and material balance may vary under variations of operating conditions and feed inputs. In some embodiments, the operating conditions, the flow rates, and the component percentages shown in Table 2 may vary from about ±5% to about ±10% from those values in Table 2, and in still other embodiments from about ±1% to about ±20% from those values in Table 2.

TABLE 2

Heat and Material Balance Corresponding to Process Flow Diagram 300 depicted in FIG. 3

| Stream Description | Units | T-301 Sour Gas From V-101 | T-302 Sour Gas To V-102 | T-303 Sour Gas To M-101 | T-304 Liquid From V-102 | T-305 Sour Gas To T-101 |
|---|---|---|---|---|---|---|
| Molar Vapor Fraction | | 1 | 0.51 | 1 | 0 | 0.8475 |
| Temperature | °C. | 28.9 | −23.4 | −23.4 | −23.4 | −56.9 |
| Pressure | bara | 76.3 | 74.8 | 74.8 | 74.8 | 31.2 |
| Molar Flow | kgmol/h | 50,803 | 50,751 | 25,885 | 24,866 | 25,885 |
| Mass Flow | kg/h | 1,281,246 | 1,280,302 | 554,014 | 726,287 | 554,014 |
| Standard Gas Flow | Nm³/h | 1,138,683 | — | 580,174 | — | — |
| Standard Gas Flow | MMSCFD | 1,020.0 | — | 519.7 | — | — |
| Actual Volume Flow | m³/hr @ T, P | 11,575 | 5,318 | 3,942 | 1,376 | 9,788 |
| Molecular Weight | | 25.2 | 25.2 | 21.4 | 29.2 | 21.4 |
| Density | kg/m³ | 111 | 241 | 141 | 528 | 56.6 |
| Viscosity | cP | 0.016 | — | 0.015 | 0.097 | — |
| Surface Tension | dyne/cm | — | — | — | 10 | — |
| Heat Flow | GJ/hr | −5,036 | −5,349 | −2,604 | −2,745 | −2,628 |
| Compressibility | | 0.693 | — | 0.549 | 0 | — |
| $C_p/C_v$ | | 1.83 | — | 2.25 | — | — |
| Pseudocritical Temperature | °C. | −15 | −15.4 | −44.9 | 15.4 | −44.9 |
| Pseudocritical Pressure | bara | 59 | 58.8 | 53.9 | 63.9 | 53.9 |
| Vapor Pressure | bara | — | — | — | 74.8 | — |
| Mass Entropy | KJ/KG-C | 5.98 | 5.06 | 6.41 | 4.02 | 6.44 |
| Methane | mol % | 58.61 | 58.67 | 75.07 | 41.6 | 75.07 |
| Ethane | mol % | 4.51 | 4.51 | 3.37 | 5.7 | 3.37 |
| Propane | mol % | 1.96 | 1.96 | 0.83 | 3.14 | 0.83 |
| i-Butane | mol % | 0.46 | 0.46 | 0.12 | 0.81 | 0.12 |
| n-Butane | mol % | 0.78 | 0.78 | 0.16 | 1.43 | 0.16 |
| i-Pentane | mol % | 0.29 | 0.29 | 0.04 | 0.55 | 0.04 |
| n-Pentane | mol % | 0.29 | 0.29 | 0.03 | 0.56 | 0.03 |
| n-Hexane | mol % | 0.23 | 0.23 | 0.01 | 0.45 | 0.01 |
| n-Heptane | mol % | 0.09 | 0.09 | 0 | 0.17 | 0 |
| n-Octane | mol % | 0.04 | 0.04 | 0 | 0.07 | 0 |
| n-Nonane | mol % | 0.01 | 0.01 | 0 | 0.02 | 0 |
| n-Decane | mol % | 0 | 0 | 0 | 0 | 0 |
| n-C11 | mol % | 0 | 0 | 0 | 0 | 0 |
| n-C12 | mol % | 0 | 0 | 0 | 0 | 0 |
| Nitrogen | mol % | 0.06 | 0.06 | 0.1 | 0.02 | 0.1 |
| $CO_2$ | mol % | 9.84 | 9.85 | 8.23 | 11.54 | 8.23 |
| $H_2S$ | mol % | 22.705 | 22.728 | 12.03 | 33.865 | 12.03 |
| $H_2O$ | mol % | 0.1 | 0 | 0 | 0 | 0 |
| M-Mercaptan | mol % | 0.0075 | 0.0075 | 0.0012 | 0.014 | 0.0012 |
| E-Mercaptan | mol % | 0.0021 | 0.0021 | 0.0002 | 0.0041 | 0.0002 |

| Stream Description | Units | T-306 RESIDUE GAS TO E-110 | T-307 CO2 + C2+ TO DEC2 T-102 | T-308 CO2 + C2 FROM V-103 | T-309 C3+ & H2S FROM T-102 | T-310 H2S FROM T-104 |
|---|---|---|---|---|---|---|
| Molar Vapor Fraction | | 1 | 0 | 1 | 0 | 1 |
| Temperature | °C. | −32.7 | 30.2 | −14.8 | 48.8 | 18.3 |
| Pressure | bara | 31 | 31.4 | 26.2 | 26.9 | 17.6 |
| Molar Flow | kgmol/h | 35,385 | 20,743 | 4,550 | 16,193 | 10,915 |
| Mass Flow | kg/h | 688,079 | 945,260 | 176,062 | 769,198 | 373,609 |
| Standard Gas Flow | Nm³/h | 793,089.9 | — | 101,983.8 | — | 244,638.1 |

TABLE 2-continued

Heat and Material Balance Corresponding to Process Flow Diagram 300 depicted in FIG. 3

| | | | | | | |
|---|---|---|---|---|---|---|
| Standard Gas Flow | MMSCFD | 710.43 | — | 91.35 | — | 219.14 |
| Actual Volume Flow | m$^3$/hr @ T, P | 18,945.1 | 1,378.1 | 2,634.4 | 1,170.3 | 12,552.3 |
| Molecular Weight | | 19.45 | 45.57 | 38.69 | 47.5 | 34.23 |
| Density | kg/m$^3$ | 36.3 | 686 | 66.8 | 657 | 29.8 |
| Viscosity | cP | 0.01 | 0.189 | 0.012 | 0.205 | 0.012 |
| Surface Tension | dyne/cm | — | 9.9 | — | 9.9 | — |
| Heat Flow | GJ/hr | −3539 | −2650 | −1259 | −1323 | −259.7 |
| Compressibility | | 0.831 | — | 0.7062 | — | 0.8343 |
| $C_p/C_v$ | | 1.57 | — | 1.38 | — | 1.46 |
| Pseudocritical Temperature | °C. | −62.4 | 109.6 | 33.1 | 131.1 | 99.8 |
| Pseudocritical Pressure | bara | 49.6 | 69.6 | 65.3 | 70.9 | 88.9 |
| Vapor Pressure | bara | — | 31.4 | — | 26.9 | — |
| Mass Entropy | KJ/KG-C | 7.687 | 2.576 | 3.793 | 2.502 | 4.713 |
| Methane | mol % | 84.12 | 0.06 | 0.27 | 0 | 0 |
| Ethane | mol % | 5.89 | 8.46 | 35.56 | 0.85 | 1.26 |
| Propane | mol % | 0.01 | 4.79 | 0 | 6.14 | 1.03 |
| i-Butane | mol % | 0.01 | 1.2 | 0 | 1.54 | 0.06 |
| n-Butane | mol % | 0.03 | 2.27 | 0 | 2.91 | 0.1 |
| i-Pentane | mol % | 0.05 | 2.63 | 0 | 3.36 | 0.08 |
| n-Pentane | mol % | 0.06 | 4.34 | 0 | 5.56 | 0.07 |
| n-Hexane | mol % | 0.03 | 6.62 | 0 | 8.47 | 0.01 |
| n-Heptane | mol % | 0 | 2.69 | 0 | 3.44 | 0 |
| n-Octane | mol % | 0 | 1.15 | 0 | 1.48 | 0 |
| n-Nonane | mol % | 0 | 0.32 | 0 | 0.41 | 0 |
| n-Decane | mol % | 0 | 0.06 | 0 | 0.07 | 0 |
| n-C11 | mol % | 0 | 0.01 | 0 | 0.01 | 0 |
| n-C12 | mol % | 0 | 0 | 0 | 0 | 0 |
| Nitrogen | mol % | 0.09 | 0 | 0 | 0 | 0 |
| $CO_2$ | mol % | 7.15 | 13.46 | 61.32 | 0.01 | 0.01 |
| $H_2S$ | mol % | 2.559 | 51.867 | 2.844 | 65.643 | 97.377 |
| $H_2O$ | mol % | 0 | 0 | 0 | 0 | 0 |
| M-Mercaptan | mol % | 0.0001 | 0.0189 | 0 | 0.0242 | 0 |
| E-Mercaptan | mol % | 0.0001 | 0.0075 | 0 | 0.0096 | 0 |

| | | Stream Number | | | |
|---|---|---|---|---|---|
| Stream Description | Units | T-311 C3+ FROM T-104 | T-312 TOTAL H2S TO SULFUR PLANT | T-313 NGL TO TREATMENT | T-314 C5+ FROM T-105 |
| Molar Vapor Fraction | | 0 | 1 | 0 | 0 |
| Temperature | °C. | 161.2 | 54.9 | 58.9 | 170.9 |
| Pressure | bara | 18.3 | 1.72 | 16.9 | 14.1 |
| Molar Flow | kgmol/h | 10,381 | 12,147 | 1,622 | 8,759 |
| Mass Flow | kg/h | 830,673 | 415,467 | 83,872 | 746,801 |
| Standard Gas Flow | Nm$^3$/h | — | 272,246.8 | — | — |
| Standard Gas Flow | MMSCFD | — | 243.87 | — | — |
| Actual Volume Flow | m$^3$/hr @ T, P | 1,752.3 | 190,170.0 | 170.7 | 1,550.2 |
| Molecular Weight | | 80.02 | 34.2 | 51.71 | 85.26 |
| Density | kg/m$^3$ | 474 | 2.18 | 491 | 482 |
| Viscosity | cP | 0.088 | 0.013 | 0.098 | 0.09 |
| Surface Tension | dyne/cm | 3.8 | — | 5.4 | 3.7 |
| Heat Flow | GJ/hr | −1655 | −358.5 | −213.1 | −1446 |
| Compressibility | | — | 0.9894 | — | — |
| $C_p/C_v$ | | — | 1.31 | — | — |
| Pseudocritical Temperature | °C. | 211.7 | 101.6 | 122.9 | 228.2 |
| Pseudocritical Pressure | bara | 32.2 | 90.1 | 40.2 | 30.8 |
| Vapor Pressure | bara | 18.3 | — | 13.5 | 14.1 |
| Mass Entropy | KJ/KG-C | 2.086 | 5.505 | 1.96 | 2.042 |
| Methane | mol % | 0 | 0 | 0 | 0 |
| Ethane | mol % | 0 | 1.13 | 0 | 0 |
| Propane | mol % | 8.52 | 0.93 | 54.19 | 0.07 |
| i-Butane | mol % | 2.66 | 0.05 | 13.5 | 0.65 |
| n-Butane | mol % | 5.66 | 0.09 | 22.7 | 2.5 |

TABLE 2-continued

Heat and Material Balance Corresponding to Process Flow Diagram 300 depicted in FIG. 3

| i-Pentane | mol % | 11.22 | 0.07 | 5.33 | 12.31 |
|---|---|---|---|---|---|
| n-Pentane | mol % | 19.9 | 0.06 | 3.24 | 22.99 |
| n-Hexane | mol % | 31.64 | 0.01 | 0.01 | 37.5 |
| n-Heptane | mol % | 12.87 | 0 | 0 | 15.25 |
| n-Octane | mol % | 5.51 | 0 | 0 | 6.53 |
| n-Nonane | mol % | 1.52 | 0 | 0 | 1.8 |
| n-Decane | mol % | 0.27 | 0 | 0 | 0.32 |
| n-C11 | mol % | 0.04 | 0 | 0 | 0.04 |
| n-C12 | mol % | 0.01 | 0 | 0 | 0.01 |
| Nitrogen | mol % | 0 | 0 | 0 | 0 |
| $CO_2$ | mol % | 0 | 1.63 | 0 | 0 |
| $H_2S$ | mol % | 0.0092 | 94.9535 | 0.0587 | 0 |
| $H_2O$ | mol % | 0 | 1.06 | 0 | 0 |
| M-Mercaptan | mol % | 0.0397 | 0 | 0.2325 | 0.004 |
| E-Mercaptan | mol % | 0.0224 | 0 | 0.0615 | 0.0152 |

Using modeling, an initial comparison was performed of the resource and equipment requirements inherent to conventional amine processes as compared to one example of an equivalent improved fractionation treatment process. Table 3 shows a comparison of the resource requirements including solvent flow rates and solvent treatment stream flow rates along with fuel requirements. The modeled improved fractionation process clearly requires less resources in terms of solvent flows, solvent treatment, and fuel requirements.

TABLE 3

Comparison of Fuel Consumption of Improved Fractionation Process to Conventional Chemical Solvent Treating Process

| Description | Conventional Chemical Solvent Treating (e.g. amine process) | Improved Fractionation Process |
|---|---|---|
| Chemical solvent treating/polishing circulation (GPM) | 49,000 | 10,500 |
| Heavies azeotrope-breaking circulation (GPM) | 0 | 4,764 |
| Chemical solvent treating fuel (MMBtu/hr) | 3,246 | 963 |
| Fractionation Fuel Required (MMBtu/hr) | 584 | 1,427 |
| Total Fuel (MMBtu/hr) | 3,830 | 2,390 |

Table 4 shows a comparison of the major capital equipment required for a conventional amine process as compared to one example of an equivalent improved fractionation treatment process. As can be seen in Table 4, the improved fractionation process requires substantially less capital equipment than the comparable conventional chemical solvent treating.

TABLE 4

Comparison of Major Equipment Columns

| Description | Conventional Chemical Solvent Treating (e.g. amine process) | Improved Fractionation Process |
|---|---|---|
| Processing trains (without separate $CO_2$ removal for chemical solvent treating) | 4xAGRU Absorbers<br>4xAGRU Strippers<br>1xDemethanizer<br>1xDeethanizer | 1xDemethanizer<br>1xCO2/H2S Splitter<br>1xDe-CO2 Column<br>1xDe-H2S Column<br>1xDebutanizer<br>1xMDEA Absorber<br>1xMDEA Stripper<br>1xDGA Absorber<br>1xDGA Stripper |
| Sub-total major equipment columns | 10 | 9 |
| Additional process trains for separate $CO_2$ removal for chemical solvent treating | 2xCO2 Absorbers<br>2xCO2 Strippers | 0 |
| Total major equipment Columns | 14 | 9 |

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention. Also, the terms in the claims have their plain, ordinary meaning unless otherwise explicitly and clearly defined by the patentee.

What is claimed is:

1. A process for the recovery of hydrogen sulfide from sour gas through fractionation comprising the steps of:
   introducing a multi-component feed stream to a first distillation column, wherein the first distillation column is a demethanizer column, wherein the multi-component feed stream comprises carbon dioxide, methane, ethane, propane, and hydrogen sulfide;

introducing an alkyl hydrocarbon mixture into the first distillation column, wherein the alkyl hydrocarbon mixture comprises ethane;

withdrawing a first vapor overhead stream from the first distillation column wherein the first vapor overhead stream is a methane-enriched stream;

withdrawing a first liquid bottoms stream from the first distillation column;

introducing the first liquid bottoms stream to a second distillation column, wherein the second distillation column is a $CO_2/H_2S$ fractionation column;

withdrawing a second vapor overhead stream from the second distillation column, wherein the second vapor overhead stream is a carbon dioxide and ethane-enriched stream;

withdrawing a second liquid bottoms stream from the second distillation column, wherein the second liquid bottoms stream is a hydrogen sulfide enriched stream;

introducing the second liquid bottoms stream to a third distillation column, wherein the third distillation column is a De-$H_2S$ fractionation column;

introducing a first azeotrope breaker into the third distillation column;

withdrawing a third vapor overhead stream from the third distillation column, wherein the third vapor overhead stream is a hydrogen sulfide enriched stream;

withdrawing a third liquid bottoms stream from the third distillation column, wherein the third liquid bottoms stream is an alkane enriched stream;

introducing the third liquid bottoms stream to a fifth distillation column, wherein the fifth distillation column is a debutanizer fractionation column;

withdrawing a fifth vapor overhead stream from the fifth distillation column, wherein the fifth vapor overhead stream is enriched in propane and lighter hydrocarbons;

withdrawing a fifth liquid bottoms stream from the fifth distillation column, wherein the first azeotrope breaker comprises at least a portion of the fifth liquid bottoms stream;

introducing the second vapor overhead stream to a fourth distillation column, wherein the fourth distillation column is a De-$CO_2$ fractionation column;

recycling at least a portion of the fifth liquid bottoms stream to the third distillation column and the fourth distillation column;

introducing a second azeotrope breaker to the fourth distillation column, wherein the second azeotrope breaker comprises at least a portion of the fifth liquid bottoms stream; and withdrawing a fourth vapor overhead stream from the fourth distillation column, wherein the fourth vapor overhead stream is a carbon dioxide-enriched stream.

2. The process of claim 1 further comprising the step of withdrawing a fourth liquid bottoms stream from the fourth distillation column and wherein the alkyl hydrocarbon mixture into the first distillation column comprises at least a portion of the fourth liquid bottoms stream.

3. The process of claim 1 wherein the first azeotrope breaker comprises at least about 80% pentane to about 100% pentane.

4. The process of claim 1 wherein the second azeotrope breaker comprises at least about 80% pentane to about 100% pentane.

5. The process of claim 1 wherein a concentration of hydrogen sulfide in the multi-component feed stream is at least about 15% and wherein the third vapor overhead stream comprises at least about 95% hydrogen sulfide.

6. The process of claim 5 wherein a concentration of hydrogen sulfide in the multi-component feed stream is at least about 20% and wherein the third vapor overhead stream comprises at least about 97% hydrogen sulfide.

7. The process of claim 1 further comprising the step of introducing the first vapor overhead stream to an amine separation system.

8. The process of claim 7 wherein the amine separation system comprises an MDEA absorber and a DGA absorber, wherein an effluent of the MDEA absorber is introduced into the DGA absorber, wherein the MDEA absorber removes a substantial portion of the hydrogen sulfide from the first vapor overhead stream, and wherein the DGA absorber removes a substantial portion of the carbon dioxide from the effluent of the MDEA absorber.

9. The process of claim 8 further comprising withdrawing a DGA overhead vapor stream from the DGA absorber, wherein the DGA overhead vapor stream comprises less than about 10 ppm hydrogen sulfide and less than about 150 ppm carbon dioxide.

10. The process of claim 1 wherein the DGA overhead vapor stream comprises less than about 4 ppm hydrogen sulfide.

11. The process of claim 1 further comprising the step of sequestering the fourth vapor overhead stream from the fourth distillation column.

12. The process of claim 1 further comprising the steps of:
operating the first distillation column at a pressure from about 300 psia to about 600 psia;
operating the second distillation column at a pressure from about 235 psia to about 535 psia;
operating the third distillation column at a pressure from about 115 psia to about 535 psia;
operating the fourth distillation column at a pressure from about 210 psia to about 510 psia; and
operating the fifth distillation column at a pressure from about 50 psia to about 350 psia.

13. The process of claim 12 further comprising the steps of:
operating the first distillation column with an overheads temperature from about −94° F. to about 6° F. and a bottoms temperature of about 35° F. to about 135° F.;
operating the second distillation column with an overheads temperature from about −43° F. to about 57° F. and a bottoms temperature of about 70° F. to about 170° F.;
operating the third distillation column with an overheads temperature from about 20° F. to about 120° F. and a bottoms temperature of about 275° F. to about 375° F.;
operating the fourth distillation column with an overheads temperature from about −18° F. to about 82° F. and a bottoms temperature of about 86° F. to about 186° F.; and
operating the fifth distillation column with an overheads temperature from about 118° F. to about 218° F. and a bottoms temperature of about 290° F. to about 390° F.;
withdrawing a fourth liquid bottoms stream from the fourth distillation column and wherein the alkyl hydrocarbon mixture into the first distillation column comprises at least a portion of the fourth liquid bottoms stream;
wherein the first azeotrope breaker comprises at least a portion of the fifth liquid bottoms stream;
wherein the second azeotrope breaker comprises at least a portion of the fifth liquid bottoms stream;
wherein a concentration of hydrogen sulfide in the multi-component feed stream is at least about 20%; and
wherein the third vapor overhead stream comprises at least about 97% hydrogen sulfide.

14. The process of claim 1 further comprising the steps of:
operating the first distillation column with an overheads temperature from about −94° F. to about 6° F. and a bottoms temperature of about 35° F. to about 135° F.;
operating the second distillation column with an overheads temperature from about −43° F. to about 57° F. and a bottoms temperature of about 70° F. to about 170° F.;
operating the third distillation column with an overheads temperature from about 20° F. to about 120° F. and a bottoms temperature of about 275° F. to about 375° F.;
operating the fourth distillation column with an overheads temperature from about −18° F. to about 82° F. and a bottoms temperature of about 86° F. to about 186° F.; and
operating the fifth distillation column with an overheads temperature from about 118° F. to about 218° F. and a bottoms temperature of about 290° F. to about 390° F.

15. A process for the treatment of sour gas comprising the steps of:
introducing a multi-component feed stream to a first distillation column, wherein the first distillation column is a demethanizer column, wherein the multi-component feed stream comprises carbon dioxide, methane, ethane, propane, and hydrogen sulfide;
introducing an alkyl hydrocarbon mixture into the first distillation column, wherein the alkyl hydrocarbon mixture comprises ethane;
withdrawing a first vapor overhead stream from the first distillation column wherein the first vapor overhead stream is a methane-enriched stream;
withdrawing a first liquid bottoms stream from the first distillation column;
introducing the first liquid bottoms stream to a second distillation column, wherein the second distillation column is a $CO_2/H_2S$ fractionation column;
withdrawing a second vapor overhead stream from the second distillation column, wherein the second vapor overhead stream is a carbon dioxide and ethane-enriched stream;
withdrawing a second liquid bottoms stream from the second distillation column, wherein the second liquid bottoms stream is a hydrogen sulfide enriched stream;
introducing the second liquid bottoms stream to a third distillation column, wherein the third distillation column is a De-$H_2S$ fractionation column;
introducing a first azeotrope breaker into the third distillation column;
withdrawing a third vapor overhead stream from the third distillation column, wherein the third vapor overhead stream is a hydrogen sulfide enriched stream;
withdrawing a third liquid bottoms stream from the third distillation column, wherein the third liquid bottoms stream is an alkane enriched stream, wherein the first azeotrope breaker comprises at least a portion of the third liquid bottoms stream;
introducing the second vapor overhead stream to a fourth distillation column, wherein the fourth distillation column is a De-$CO_2$ fractionation column;
introducing a second azeotrope breaker to the fourth distillation column; and
withdrawing a fourth vapor overhead stream from the fourth distillation column, wherein the fourth vapor overhead stream is a carbon dioxide-enriched stream.

16. The process of claim 15 further comprising the step of third introducing the third vapor overhead stream from the third distillation column to a sulfur plant.

* * * * *